United States Patent Office 3,528,707
Patented Sept. 15, 1970

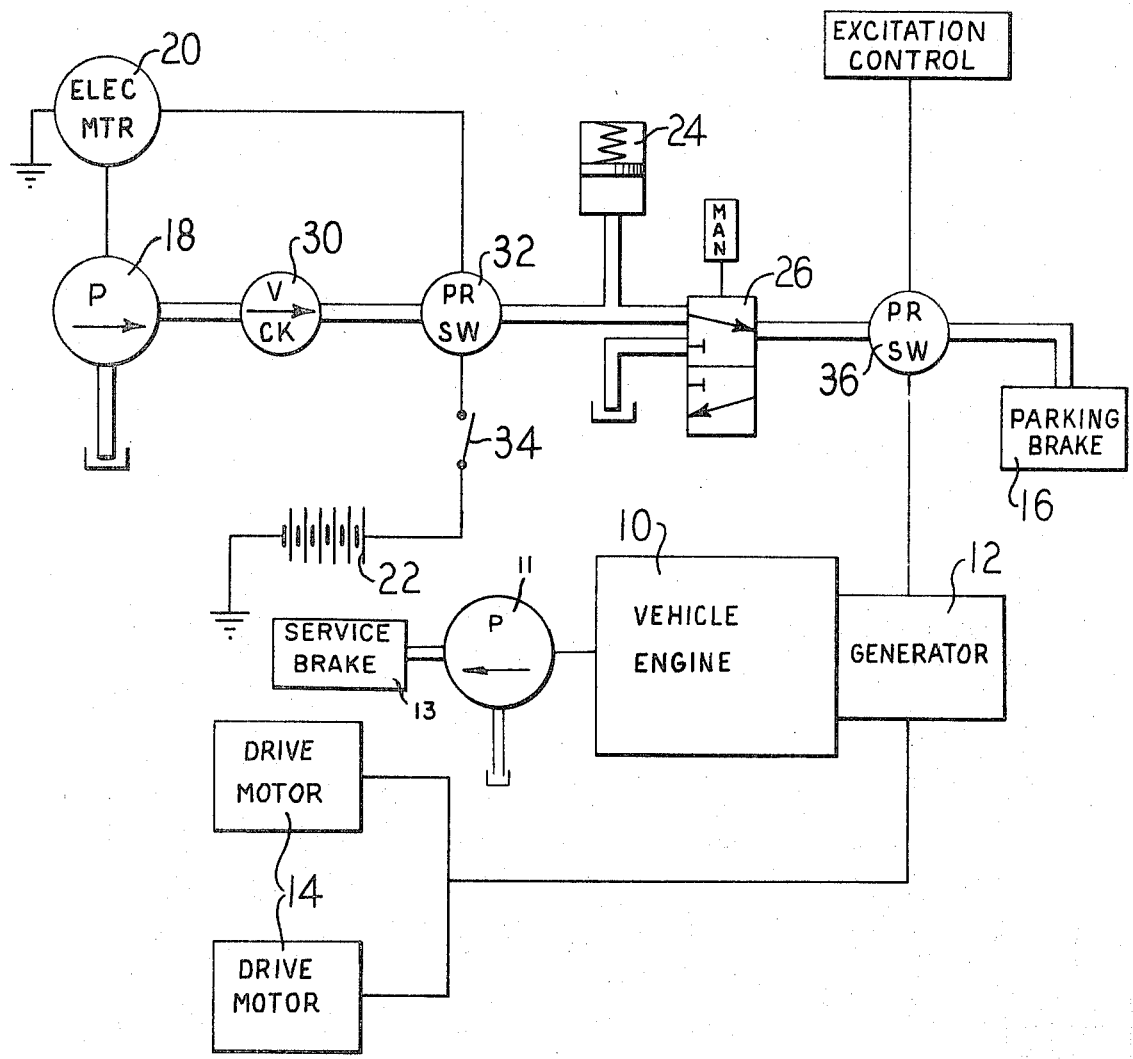

3,528,707
PARKING AND EMERGENCY BRAKE SYSTEM
Robert Casey, Washington, Ill., assignor to Caterpillar Tractor Co., Peoria, Ill., a corporation of California
Filed Sept. 25, 1968, Ser. No. 762,567
Int. Cl. B60t *13/66*, *7/12*
U.S. Cl. 303—10                        4 Claims

ABSTRACT OF THE DISCLOSURE

A parking brake system particularly designed for heavy vehicles which have service brakes applied by pressure generated by the engine of the vehicle and released by spring pressure, and parking brakes applied by springs and released by hydraulic pressure. The pressure for releasing the parking brakes is from a separate source and enables safe towing or coasting of the vehicle when the engine generated pressure has failed.

---

It is customary in heavy vehicles to have service brakes actuated by implement pressure or by pressure generated by the vehicle engine which pressure is also employed for actuating various implements and vehicle components. When service brakes depend upon such pressure for operation, it becomes unsafe to move the vehicle when the pressure fails or the engine is inoperative. The present invention provides a friction type parking and emergency brake system with brakes applied by springs and releasable by pressure. The pressure for these brakes is applied from a separate source so the brakes can be released to permit operation of the vehicle. However, upon failure of the service brakes the presure is to the emergency brakes can be released so that they are applied by their springs. Thus the vehicle, though without service brakes, may be safely coasted or towed while under control of the parking and emergency brakes.

Another safety feature provided by the present invention is that operation of the vehicle under power is made to depend upon the presence of pressure in the emergency brake system so that the vehicle cannot be driven under power while the emergency brakes are applied. A further and more complete understanding of the invention is set forth in the following specification wherein reference is made to the accompanying drawing.

The drawing is a schematic view of a circuit for a parking and emergency brake system embodying the present invention.

The invention may be used with a vehicle of the type having an electric drive and which comprises, as illustrated in the drawing, a vehicle engine 10 connected in driving relationship with a generator 12 from which power is taken to actuate an electric motor, or as in the present case a pair of motors 14, associated with driving wheels of the vehicle. While it is not necessary to disclose the service brake system of such a vehicle, it generally includes a hydraulic system charged by a pump 11 driven by the vehicle engine 10 providing pressure for the actuation of various vehicle components as well as for the application of brakes 13 which may be friction brakes applied to a disc or the like associated with the drive motors.

In accordance with the present invention a parking brake shown at 16, which is preferably of the friction type and may be applied to the same rotatable part as the service brakes, is applied by springs in a conventional manner, which are not shown in this diagram, and released by pressure afforded by a pump 18. The pump is driven by an independent power source such as, for example, electric motor 20 in circuit with the vehicle battery 22. Fluid under pressure is directed by the pump to an accumulator 24 and thence through a valve 26 shown in its open position to the brake 16 for maintaining it in its released position. The fluid from the pump passes through a conventional check valve 30 and a pressure switch 32 which opens the circuit between the battery and the motor 20 when the pressure in the system is of a value which ensures disengagement of the brake. A switch 34, in series with the pressure switch 32, is manually opened when the vehicle is out of service. If the operator wishes to apply the parking brake, he manipulates the valve 26 to its alternate position, discontinuing flow from the pump and venting the parking brake to the tank. Thus upon failure of the service brakes from any cause, the operator can manipulate the parking brake so that towing or coasting may be safely accomplished.

A second pressure switch is shown at 36 which breaks the excitation circuit to the generator 12 when pressure is low in the parking brake system. Consequently, if the machine is idle without ample pressure in the parking brake system, it is necessary after closing of the switch 34, to await buildup of pressure by the motor 20 and pump 18 before the vehicle engine is capable of operating the vehicle through the generator before the parking brake is released.

What is claimed is:

1. A parking and emergency brake system for a vehicle which has a service brake system energized by pressure from a pump driven by the vehicle engine, said first named system comprising a parking and emergency brake adapted to be engaged by spring pressure and to be disengaged by pressure from a separate pump driven by a power source independent of said vehicle engine.

2. A parking and emergency brake system for a vehicle which has a service brake system energized by pressure from a hydraulic pump driven by the vehicle engine, said first named system comprising a parking and emergency brake adapted to be engaged by spring pressure and to be disengaged by pressure derived from a battery driven motor.

3. The system of claim 2 in which the parking brake system includes an accumulator and automatic means for maintaining a preestablished minimum pressure in the system.

4. The system of claim 3 with means to prevent driving of the vehicle by its engine when the pressure in the parking brake system is below the preestablished minimum.

References Cited

UNITED STATES PATENTS

| 1,737,161 | 11/1929 | Jupp. | |
| 2,680,500 | 6/1954 | Jenkins | 188—106 X |
| 2,834,438 | 5/1958 | Riddle et al. | 188—106 X |
| 3,116,095 | 12/1963 | Leighton | 303—9 |
| 3,181,426 | 5/1965 | Ike. | |
| 3,463,276 | 8/1969 | Brooks | 188—170 X |

TRYGVE M. BLIX, Primary Examiner

J. J. MCLAUGHLIN, Jr. Assistant Examiner

U.S. Cl. X.R.

180—82; 188—106, 170; 303—3, 9, 13, 18